United States Patent [19]
Alexandrov et al.

[11] 4,000,983
[45] Jan. 4, 1977

[54] METAL-CERAMIC

[76] Inventors: Vladimir Ilich Alexandrov, ulitsa Ostrovityanova, 31, kv. 281; Vyacheslav Vasilievich Osiko, ulitsa Vavilova, 48, kv. 63, both of Moscow; Ernest Nikolaevich Muraviev, ulitsa Popova, 10, kv. 36, Fryazino Moskovskoi oblasti; Eduard Georgievich Spiridonov, Preobrazhensky val, 24a, kv. 1, Moscow; Vladimir Mikhailovich Tartarintsev, Leninsky prospekt, 45, kv. 112, Moscow; Vladimir Grigorievich Gordon, 13 Parkovaya, 31, korpus 1, kv. 83, Moscow, all of U.S.S.R.

[22] Filed: July 24, 1974

[21] Appl. No.: 491,519

[30] Foreign Application Priority Data

July 26, 1973 U.S.S.R. .............................. 1935249
July 26, 1973 U.S.S.R. .............................. 1935248

[52] U.S. Cl. .................................. 29/182.5; 75/176

[51] Int. Cl.$^2$ ........................................ C22C 31/00
[58] Field of Search ............. 29/182.5; 75/176, 206

[56] References Cited

UNITED STATES PATENTS

| 2,785,974 | 3/1975 | Moore | 75/206 |
| 3,175,279 | 3/1965 | Scruggs | 75/206 |
| 3,284,194 | 11/1966 | Scruggs | 75/206 |
| 3,361,558 | 1/1968 | Scruggs | 75/206 |

*Primary Examiner*—Brooks H. Hunt
*Attorney, Agent, or Firm*—Holman & Stern

[57] ABSTRACT

The invention relates to metal-ceramics based on high-melting oxides and metallic chromium.

The distinguishing feature of the ceramic cermets of this invention resides in the fact that chromites of rare earth metals, yttrium chromite of scandium chromite are used as the high-melting oxides.

2 Claims, No Drawings

METAL-CERAMIC

The present invention relates to heatproof materials, viz. metal-ceramics which are widely known under the name cermets. For the sake of brevity, the word cermets will be employed equivalently hereinafter for the term metal-ceramics.

The cermets are known to comprise a ceramic phase and a chemically free metal in the form of a sintered mass.

The ceramic phase may be represented by high-melting metal oxides, and for the most part of aluminum oxide and chromium oxide. In such a case, the metallic phase is represented by metallic chromium.

The ceramic phase may likewise be represented by oxygen-free ceramics, such as borides, silicides, carbides, etc., with the metallic phase being metallic molybdenum, metallic tungsten, metallic titanium, metallic cobalt, etc.

The present invention is directed toward improving metal-ceramics comprising high-melting metal oxides and metallic chromium, or based on said components.

It is currently widely known to employ cermets comprising from 30 to 70 percent by weight of metallic chromium and from 70 to 30 percent by weight of aluminum oxide or chromium oxide.

These known cermets are characterized by enhanced electric resistivity of the surface layer arising from exposure to oxidizing conditions at an elevated temperature. As shown by experience, after such materials have been exposed for only a few hours to a temperature of from 1,300° to 1,400° C, in an atmosphere of air, the electric resistivity of their surface layer rises from $10^{-3}$ ohm.cm. to $1 - 10^{-1}$ ohm.cm., in all probability due to the emergence on the surface of such materials of solid solutions, namely aluminum oxide - chromium oxide.

The increased resistivity is prohibitive to the application of these cermets in certain fields. Thus, they cannot be employed as electrodes in open-cycle MHD generators, which are required for exhibiting high electrical conductivity throughout the entire service period.

It is likewise known to employ cermets based on carbides, borides, silicides, molybdenum, tungsten, titanium and cobalt; however, these latter materials when exposed to oxidizing conditions at elevated temperature undergo intensive oxidation both in the ceramic, and in the metallic phase.

The cermets based on chromium oxide and metallic chromium feature a further disadvantage which consists in the high volatility of chromium oxide at elevated temperatures in the presence of oxygen.

All the above disadvantages impose limitations on the possible uses of these materials.

Thus, such cermets cannot be used as materials which require the preservation of high electrical conductivity and oxidation resistance for prolonged exposure to oxidizing conditions at elevated temperatures; electrodes of an open-cycle MHD generator are one example of items which cannot be manufactured from the cermets in question.

These known cermets are used primarily as structural materials for manufacturing items designed for operation at relatively low temperatures (below 1,200° C.), such as turbine vanes, members of cathode units, etc.

It is a principal object of the present invention to provide a cermet of such an optimal composition which would be conducive to the elimination of the chief disadvantages of the above-described prior cermets.

More specific objects of the present invention are the reduction of the electric resistance of the surface layer of the cermets, to improve their oxidation resistance at high temperatures of not less than 1,400° C., to widen the scope of application of the cermets to include, inter alia, electrodes of open cycle MHD generators, rocket nozzle members, etc.

Accordingly, provided herein is a metal-ceramic comprising high-melting metal oxides, and metallic chromium, which, in accordance with the invention, comprises metal chromites as the high-melting metal oxides.

The foregoing objects are attained by the fact that in a metal-ceramic comprising high-melting metal oxides, and metallic chromium, in accordance with the invention, chromites of rare earth metals, yttrium chromite or scandium chromite are employed as the high-melting metal oxides.

Specifically, the proposed cermet may have the following composition, in wt.%:

metal chromites, from 4 to 95; metallic chromium, the balance.

The metal chromites as employed in the proposed cermet may be chromites of rare-earth metals, yttrium chromites, or scandium chromites, taken separately, or in combinations.

The invention will be further understood from the following detailed description thereof with reference to some illustrative examples.

The metal-ceramic in accordance with the invention comprises metallic chromium and at least one high melting metal chromite selected from the group consisting of chromites of rare earth metals, yttrium chromite and scandium chromite, with the metal chromites accounting for from 4 to 95 percent by weight of the total material, and with metallic chromium making up the balance.

The cermets of this invention may be manufactured by the same methods as are employed in the manufacture of the known cermets, of which powder metallurgy and hot molding are by far the most popular techniques.

The sets of conditions used in the manufacture of the proposed cermets are likewise conventional. Thus, the sintering and molding temperature is within the usual range of from 1,400° to 1,800° C. The time of exposure to the elevated temperature and pressure depends on the very same factors which govern the processes of production of the known cermets. The methods of manufacturing the cermets are not described in detail as they are widely known.

The charge is prepared in the same way as is used in the production of the known cermets except that the above-mentioned chromites are employed as the high-melting metal oxides.

The starting components are taken in the form of powders mixed as carefully as the parent substances of the known cermets.

The charge components are taken in the ratio corresponding to that required in the prescribed cermet composition. The particle size of the parent powders is also within the ordinary limits: i.e. from 1 to 100 mcm.

The invention will now be illustrated by specific examples of compositions with their properties being characterized.

EXAMPLE 1

A cermet having the following composition, in wt. percent:

| | |
|---|---|
| lanthanum chromite | 60 |
| metallic chromium | 40 |

The cermet has the following properties: after 15 hours of heat treatment in air at 1,400° C, the electric resistivity of the surface layer is $10^{-2}$ ohm.cm., oxidation resistance: after 10 hours of exposure at 1,400° C in air, the weight increase is 20 mg/sq.cm.

EXAMPLE 2

A cermet having the following composition, in wt. percent:

| | |
|---|---|
| neodymium chromite | 70 |
| metallic chromium | 30 |

The cermet has the following properties: after 5 hours of heat treatment in air at 1,400° C, the electric resistivity of the surface layer is $5.10^{-2}$ ohm.cm.; the oxidation resistance, after 10 hours of exposure at 1,400° C, in air, the weight increase is 15 mg/sq.cm.

EXAMPLE 3

A cermet having the following composition, in wt. percent:

| | |
|---|---|
| samarium chromite | 80 |
| metallic chromium | 20 |

The cermet has the following properties: after 5 hours of heat treatment in air at 1,400° C, the electric resistivity of the surface layer is $10^{-1}$ ohm.cm.; the oxidation resistance, after 10 hours of exposure at 1,400° C, in air, the weight increase is 10 mg/sq.cm.

EXAMPLE 4

A cermet having the following composition, in wt. percent:

| | |
|---|---|
| gadolinium chromite | 50 |
| metallic chromium | 50 |

The cermet has the following properties: after 5 hours of heat treatment in air at 1,400° C, the electric resistivity of the surface layer is $5.10^{-3}$ ohm.cm.; the oxidation resistance, after 10 hours of exposure at 1,400° C, in air, the increase in weight is 25 mg/sq.cm.

EXAMPLE 5

A cermet having the following composition, in wt.%:

| | |
|---|---|
| dysprosium chromite | 40 |
| metallic chromuim | 60 |

The cermet has the following properties: after 5 hours of heat treatment in air at 1,400° C, the electric resistivity of the surface layer is $10^{-3}$ ohm.cm.; the oxidation resistance, after 10 hours of exposure at 1,400° C, in air, the increase in weight is 30 mg/sq.cm.

EXAMPLE 6

A cermet having the following composition, in wt. percent:

| | |
|---|---|
| erbium chromite | 30 |
| metallic chromium | 70 |

The cermet has the following properties: after 5 hours of heat treatment in air at 1,400° C, the electric resistivity of the surface layer is $7.10^{-4}$ ohm.cm.; the oxidation resistance, after 10 hours of exposure at 1,400° C, in air, the increase in weight is 35 mg/sq.cm.

EXAMPLE 7

A cermet having the following composition, in wt.%:

| | |
|---|---|
| ytterbium chromite | 20 |
| metallic chromium | 80 |

The cermet has the following properties: after 5 hours heat treatment in air at 1,400° C, the electric resistivity of the surface layer is $10^{-4}$ ohm.cm.; the oxidation resistance, after 10 hours exposure at 1,400° C, in air, the increase in weight is 40 mg/sq.cm.

EXAMPLE 8

A cermet having the following composition, in wt.%:

| | |
|---|---|
| yttrium chromite | 60 |
| metallic chromium | 40 |

The cermet has the following properties: after 5 hours heat treatment in air at 1,400° C, the electric resistivity of the surface layer is $5.10^{-3}$ ohm.cm.; the oxidation resistance, after 10 hours exposure at 1,400° C, in air, the increase in weight is 20 mg/sq.cm.

EXAMPLE 9

A cermet having the following composition, in wt.%:

| | |
|---|---|
| scandium chromite | 70 |
| metallic chromium | 30 |

The cermet has the following properties: after 5 hours heat treatment in air at 1,400° C, the electric resistivity of the surface layer is $5.10^{-2}$ ohm.cm.; the oxidation resistance, after 10 hours exposure at 1,400° C, in air, the increase in weight is 15 mg/sq.cm.

EXAMPLE 10

A cermet having the following composition in wt.%:

| | |
|---|---|
| lanthanum chromite | 4 |
| metallic chromium | 96 |

The cermet has the following properties: after 5 hours heat treatment in air at 1,400° C, the electric resistivity of the surface layer is $3.10^{-4}$ ohm.cm.; the oxidation resistance, after 10 hours exposure at 1,400° C, in air, the increase in weight is 50 mg/sq.cm.

What is claimed is:

1. A metal-ceramic material comprising metallic chromium and at least one high-melting metal chromite selected from the group consisting of chromites of rare earth metals, yttrium chromite, and scandium chromite.

2. The metal-ceramic material as set forth in claim 1, comprising, from 4 to 95 weight percent of said metal chromite component, the balance being said metallic chromium.

* * * * *